Patented Apr. 11, 1944

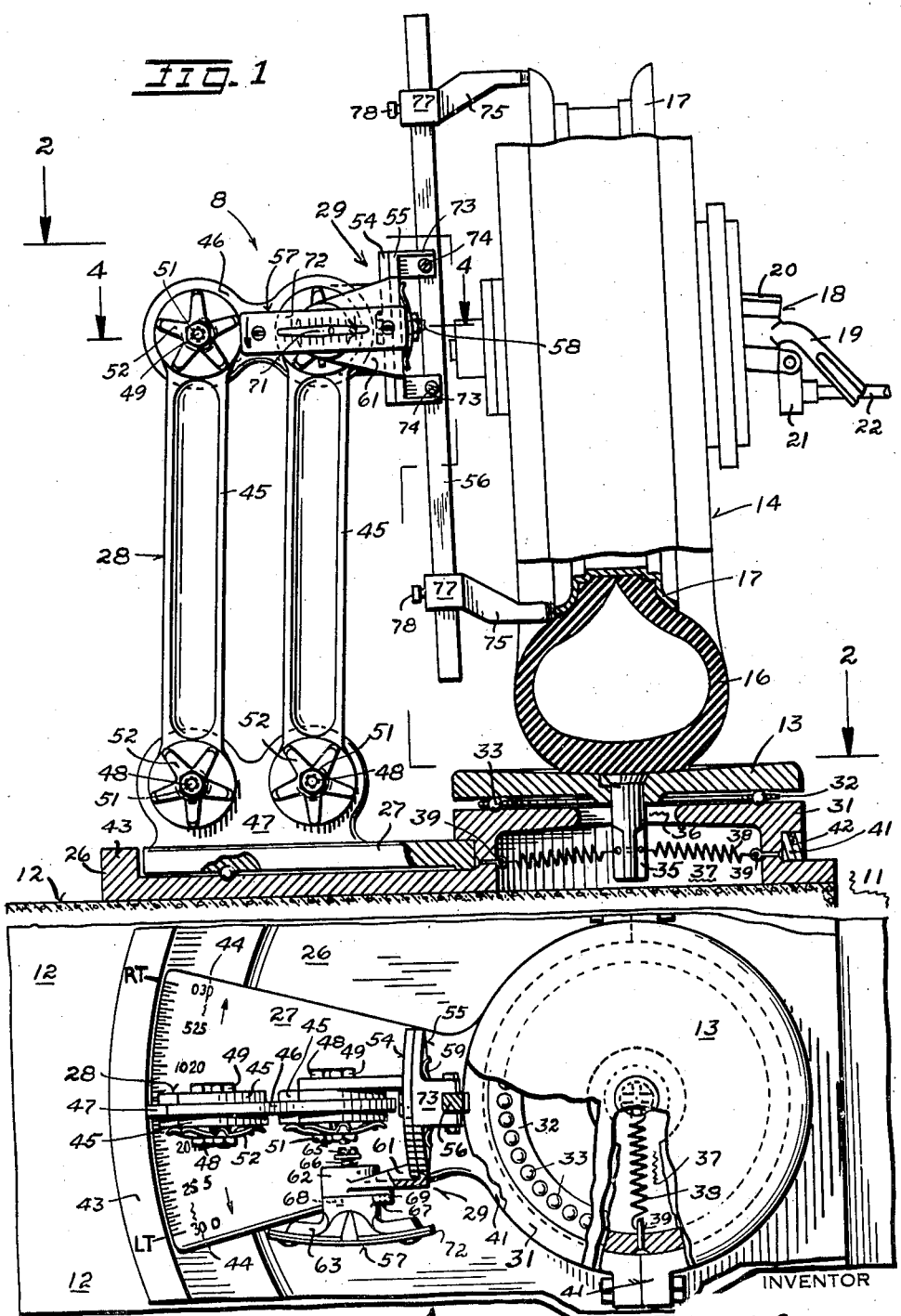

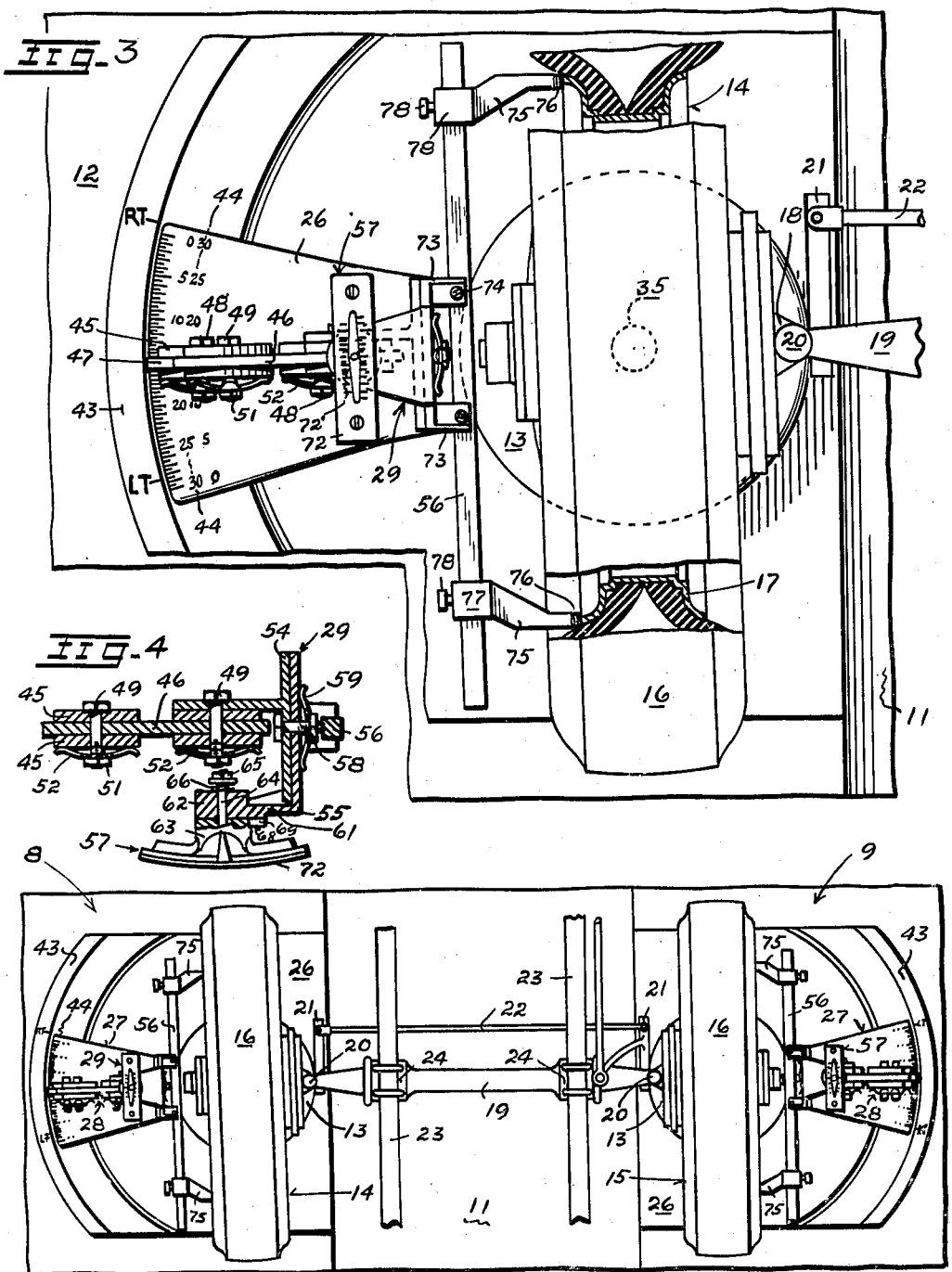

2,346,360

UNITED STATES PATENT OFFICE 2,346,360

WHEEL ALIGNMENT GAUGE

John L. Creagmile, Oakland, Calif.

Application December 1, 1941, Serial No. 421,185

13 Claims. (Cl. 33—203)

The invention relates to apparatus for gauging various alignment relations of dirigible wheels of land vehicles.

An object of the invention is to provide a generally improved and simplified apparatus for gauging such factors as the camber, caster, toe-in turning radius and king pin inclination of the dirigible wheels automobiles and other wheeled vehicles, while the wheels are mounted on the vehicles.

Another object is to provide an improved method and means for the gauging of the alignment relations of dirigible wheels of a vehicle while the same are operative to support the vehicle in their intended manner.

A further object is to provide an improved and simplified mounting for movable gauging heads of the apparatus.

Yet another object is to provide a mounting for the wheels such that their swinging for gauging purposes may be effected with a minimum of frictional resistance.

The invention possesses other objects and features of advantage, some of which, with the foregoing will be set forth or be apparent in the following description of a typical embodiment of the invention which is illustrated in the accompanying drawings, in which, Figure 1 is an enlarged and partly sectional elevation of a gauging unit embodying the present features of invention and shown as having a test bar thereof disposed in upright position opposite a wheel to be gauged for its alignment relations.

Figure 2 is a fragmentary and partially sectional plan view of the unit of Figure 1 taken on the broken line 2—2 in Figure 1.

Figure 3 is a plan view showing the unit in use at a wheel when the test bar is horizontal.

Figure 4 is a fragmentary section at the line 4—4 in Figure 1.

Figure 5 is a plan view showing an assembly of a complementary pair of the gauging units having their test bars horizontal and disposed as for measuring the toe-in of a pair of dirigible wheels.

In its present embodiment, the wheel gauging means of my invention comprises similar and mutually complementary gauging units 8 and 9 positioned and arranged for the disposal between them of the dirigible wheel assembly of a vehicle having a pair of cooperative dirigible wheels. As a means to facilitate the making of necessary adjustments of the vehicle parts for effecting any required correction of wheel alignment relations disclosed by the use of the apparatus, the units 8 and 9 may be disposed at opposite sides of a mechanic's pit 11 extending below a level floor 12; the use of the present apparatus for gauging does not, however, require the provision of a pit.

As shown, turntables 13 of the units 8 and 9 support a dirigible wheel assembly to be gauged, the latter comprising right and left-hand wheels 14 and 15 having pneumatic tires 16 on tire-mounting rims 17 and mounted on the spindles of steering knuckles 18 pivoted to the ends of a usual axle 19 by means of generally upright king pins 20. The usual spindle arms 21 extend from the steering knuckles 18 and are connected by a tie rod 22 of adjustable length. The axle 19 supports the vehicle body (not shown) through springs 23, said springs engaging spaced spring perches 24 on the axle and being only fragmentarily shown. While, for purposes of illustration, each steering knuckle 18 is shown as directly connected to the axle 19 by means of the king pin 20, it will be understood that a "knee action" or other connection might be interposed between the king pin and axle without effecting the dirigibility of the wheel or the alignment relations to be gauged.

The gauging units 8 and 9, which are provided for simultaneous or selective gauging use at the outer sides of the wheels 14 and 15 respectively, are of similar structure but have their corresponding elements complementarily related and/or formed in the respective assemblies whereby said elements may be placed in corresponding relation at the outer sides of the adjacent wheels. As shown, each said unit comprises a bed plate 26, an elongated base plate 27 carried by said bed plate for its adjustment about a fixed vertical axis at its inner end, a turntable 13 mounted on the bed plate 26, a standard or post 28 carried on the base 27 at its outer end, and a testing head assembly 29 mounted on the post.

The turntable 13 of each gauging unit comprises a disc preferably having a slightly cupped upper face and rotatably supported upon an upwardly offset inner end portion 31 of the bedplate 26. Since the gauging operations to be performed with the present apparatus involve a rocking of a wheel on the turntable and, because of the fact that the king pin axis is not vertical, a rocking of a wheel upon a turntable which is held to its rotation about a fixed vertical axis requires a slippage of the bearing point of the wheel on the turntable. In the present structure, the turntable 13 is so mounted on the bed-plate 26 as to permit the lateral movement of the turntable with the bearing point of the tire constantly engaging the same turntable point, and so eliminates the otherwise required slippage of the tire on the turntable.

As particularly illustrated, a flat anti-friction bearing ring 32 is disposed between the turntable and the top of the bed-plate portion 31, said ring being provided with a circle of ball bearings 33 for engaging the opposed faces of the turntable and portion. A ball-race groove is provided in the top of the portion 31 for maintaining a laterally centered relation of the bearing ring 32 with respect to the portion, while the turntable 13 is movable both laterally and rotatably upon the ring under control of a means for yieldingly urging the disposal of the turntable 13 in a normal laterally and rotatively centered relation to the base portion 31.

As shown, a stem 35 depends from the turntable through a central opening 36 in the bed-plate portion 31, the bore of said opening being somewhat larger than the stem 35, whereby to permit and limit the lateral displacement of the turntable from a laterally centered position over the portion 31. The stem 35 extends into a cavity 37 of the bed plate 26 beneath its offset portion 31, and tension springs 38 radiate from connections about said stem to anchorage eyes 39 provided at the sides of the cavity. The springs 38 are symmetrically arranged about the stem 35 and are of substantially like strength whereby they may constantly urge the turntable to a normal laterally centered position in which the stem 35 is substantially centered in the hole 36. It will be noted that the present application of the tension springs 38 between fixed points of the turntable stem 35 and the eyes 39 also urges the maintenance of the turntable in a rotatively centered position whereby the springs are operative to aid a return of the turntable, and a wheel thereon, to a normal or initial position thereof. Preferably, and as shown, the springs 38 slope downwardly from their points of attachment to the stem 35 whereby the downward component of their pull may in itself constantly urge a distinct pressure seating of the turntable on the bed-plate portion 31 independently of the support of a wheel on the turntable.

The base-plate 27 is swivelled on the bed-plate 26 for a limited swinging thereof about the normal axis of rotation of the turntable 13 and is itself a turntable carrying the testing head 29 eccentrically to its vertical axis of rotation. As particularly illustrated, the inner end portion of the base plate 27 is formed to provide an eye or annular ring 41 for engagement in a complementary annular groove 42 provided in the bed plate 26 below and coaxial with its portion 31, the eye 41 being diametrically split or otherwise arranged for mounting or dismounting it with respect to the groove 42. The outer portion of the base-plate 27 beyond the eye 41 is generally sector-shaped, and its extreme outer edge is curved as an arc about the axis of swinging of the plate, the end thereat being flush with an opposed and upwardly extending end portion 43 of the bed-plate 26. The bed-plate portion 43 and the adjacent end of the base-plate 27 are provided with suitable calibrations for use in measuring the angle of turning of a wheel from a straight-ahead setting thereof.

As particularly illustrated, angle scales 44 are delineated on the base plate adjacent its outer edge for selective use with reference zero points "RT" and "LT" indicated on the bed-plate portion 43. It will be noted that the different scales 44 indicate angular ranges from zero to thirty degrees and are relatively reversed in their lines whereby the zero of each scale is aligned with the thirty-degree mark of the other. The zero marks "RT" and "LT" are thirty degrees apart whereby they may simultaneously register with the zero marks of the different scales 44 when the longitudinal axis of the base plate 27 is parallel to the axle 18 for a wheel supported on the turntable. It will be noted that the present scale arrangement, while providing for the use of a different scale 44 for measured right and left turn displacements of the base plate, permits the use of a base plate which is only half as wide at its outer end as would be needed if a common reference point on the bed-portion 43 is to be used for equal angular shifts to either side of a zero setting of the base plate 27. The zero points and the scales 44 may, of course, be mutually reversed with respect to their provision on the bed-plate and base-plate.

The gauging heads 29 are carried on the standards 28 for mutually independent translation movements thereof toward or from wheels mounted on the corresponding turntables 13 and in vertical planes which are radial of the pivotal axes of the base plates 27. Essentially, the present standards 28 comprise like assemblies of elements pivoted together as the sides of a parallelogram, with the base and sides and top of the structure respectively provided by the base-plate 27 and side elements 45 and top elements 46. As illustrated, each plate 27 is provided with a fixed upstanding extension 47 disposed in a vertical plane including the axis of pivoting of the plate and provided with spaced openings which receive bolts 48 therethrough and in a common horizontal plane for hingedly connecting the bottom ends of the post side elements 45. Hinge bolts 49 connect the head-carrying top element 46 with top points of the side elements 45, said bolts having the same mutual spacing as the bolts 48 at the base extension 47 and being at like distances from the corresponding bolts 48 of the side elements 45. The bolts 48 and 49 thus define the corners of a parallelogram for permitting a swinging of the side post elements 45 about their axes of hinging at the extension 47 to distort the parallelogram in its plane for variably spacing the head-carrying post element 46 with respect to an opposed wheel on a turntable 13 while the plane of the bolts 49 remains parallel to the plane of the bolts 48, the latter plane comprising the elements 45 and 46 whereby the post is swingable in a vertical plane including the vertical axis of swinging of the base plate 27.

Preferably, and as shown, the base extension 47 and the element 46 are engaged between pairs of side elements 45 whereby a mechanically symmetrical post structure is provided. The pivot bolts 48 and 49 are similar and mount nuts 51 between which and the opposed elements 45 spring washers 52 are axially compressed to provide an adjusted degree of friction against a swinging distortion of the parallelogram post structure, whereby to retain the post in adjustably set position; in this manner, special locking screws or pins are unnecessary for securing the post in gauging or withdrawn position. The plane of swinging of the post 28 is arranged to be parallel to the line of the vehicle axle when the plate 27 is set in its described zero position.

Each testing head 29 essentially comprises a base section 54 pivoted to the post top for swinging about an axis perpendicular to the plane of swinging of the post 28 which supports it, a section 55 swivelled to the section 54, a testing bar 56 fixedly carried by the member 55, and an arcuate spirit-level gauge unit 57 swivelled on the member 55 for rotative adjustments about an axis which is perpendicular to the axis of swinging of the latter member. As particularly shown, the inner pivot bolt 49 at the top of the post extends through a tongue-like outer portion of the member 54 interposed between the bolt head and the adjacent post side 45 whereby the member is arranged to be held in rotatively adjusted position for a desired application of the testing bar 56 without requiring the use of a clamp screw or other locking device.

As is brought out in Figures 1 and 4, the swivel connection for the head section 55 comprises a pivot bolt 58 engaged through opposed disc portions of the sections 54 and 55 and a spring washer 59, to effect a frictional engagement of the member for securing the section 55 in adjusted set position while permitting its manual swinging the plane of swinging of the post 28 including the axis of swinging of the base plate 27 which carries the post. The member 55 carries the spirit level gauge unit 57 on an arm 61 which extends axially of the member from the periphery of its disc portion and clear of the disc portion of the member 54; as shown, the arm 61 terminates in a cylindric hub 62 which has the axis of its bearing bore perpendicular to and intersecting the swivel axis for the member 55.

The unit 57 comprises a base portion 63 seated against one hub end and has a stem 64 which extends rotatably through the bore of the hub 62 and threadedly mounts a nut 65 between which and the opposed hub end a compression spring 66 is operative to frictionally engage the hub 62 and base 63 to such an adjusted degree that the unit may be frictionally held in one set position while manually displaceable to another set position. Preferably, and as shown, stops 67 and 68 extend from the hub 62 at opposite sides of an arm 69 extending from an adjacent point of the unit base 63, said stops being so disposed that the unit is limited to a ninety degree adjustment between a position in which its leveling line is parallel to the swivel axis, as in Figures 1 and 2, and a position in which it is perpendicular to said swivel axis, as in Figure 3; the arm 69 engages the stops 67 and 68 in the respective said positions. The base 63 fixedly mounts a more or less spindle-shaped spirit level 71 disposed behind a sight opening provided in a graduated scale plate 72 adjustably fixed on the base, the graduations 72' of said plate representing the angularity of the leveling (longitudinal) line of the level with respect to the horizontal. The present level structure and arrangement is such that level indications will be given with respect to the graduations of the scale plate 72 whether said plate is vertical as in Figures 1 and 2, or horizontal as in Figure 3.

The present test bar 56 is of uniform rectangular cross-section and is engaged in and between mutually aligned slots provided at the inner ends of diametrically spaced axial extensions 73 of the disc portion of the head member 55, with set screws 74 securing the bar in adjusted position in the slots. Gauging arms 75 are mounted on the bar 56 for adjusted positioning therealong for the simultaneous engagement of their free ends 76 with corresponding points of a wheel being gauged; as shown, the free arm ends 76 are disposed to engage opposite side points of a tire-mounting rim 17. Eye portions 77 at the attached arm ends complementarily receive the test bar 56, and thumb screws 78 mounted in said eye portions are provided to secure the arms in adjustably set position on the bar.

The arm ends 75 are preferably chisel-shaped with their edges mutually aligned in a line which intersects the swivel axis of the member 55 and the arm, and is perpendicular to said axis. As shown, the testing bar assembly is such that the longitudinal test bar axis is parallel to the gauging line of the arm ends 76 whereby the bar is also perpendicular to the swivel axis of the member 25 and the perpendicular relation of the gauging line of the points 76 to said swivel axis is not changed by an adjustment shifting of either the bar or arms. It will be understood that the adjustability of the bar 56 on the gauging head member 55 and the adjustability of the arms 75 on the bar jointly provide for simultaneously disposing the arm points 76 against spaced and corresponding points of different wheels having different sizes and supported on the turntables 13 in the disclosed manner. For accuracy, it is preferred to apply the arm points 76 to the metal rim 17, since the axial thickness of a pneumatic tire may vary somewhat about the tire, and the bulge at the bottom of a vehicle supporting tire on a turntable 13 prevents a disposal of the bar 56 parallel to the opposed tire side if the points 76 are applied thereto.

As particularly shown, the level-carrying arm 65 is so related to the head member 55 from which it extends that the plane of swinging of the level unit 57 thereon is parallel to the gauging line of the test bar points 76. With the level so mounted, its levelling line will be perpendicular to said gauging line when it is parallel to the swivel axis of the member 55 (Figures 1 and 2) and will be parallel to said gauging line when it is perpendicular to said swivel axis (Figure 3). Thus, when the test bar 56 is upright, as in Figures 1 and 2, the level is at one side of the post 28 and is disposed with its levelling axis parallel to the swivel axis and perpendicular to the gauging line of the bar at its arm ends whereby it is usable to measure the angularity of said gauging line from the vertical. Also, when the test bar 56 is generally horizontal, as in Figures 3 and 5, the level would be extended parallel to the bar for use in levelling the bar or measuring the angularity of its gauging line from the horizontal.

When the test bar 56 is upright, as in Figures 1 and 2, the described apparatus is arranged for use in gauging the camber of a wheel resting on the adjacent turntable 13 and the caster of the king-pin by which the wheel is secured to the axle which it supports. Recalling that camber is measured as the angle of the wheel plane from a vertical plane parallel to the longitudinal axis of the vehicle of the wheel, the measurement of camber is taken on the level scale 72' by applying the gauge points 76 at spaced and corresponding points of the wheel while the wheel is in straight-ahead position with respect to the vehicle and the post base-plate 27 is set in its zero position; if desired, the test bar 56 may be temporarily swung to horizontal position for reference in setting the wheel to the straight-ahead position. Knowing the required camber reading on the scale 72', a comparison of the actual reading with its desired value will inform the operator as to the direction and amount of any correction which may be required, it being understood that dirigible wheels of a cooperating pair are gauged independently for camber.

Noting that the king-pins for a pair of wheels slope forwardly and outwardly from their tops with respect to the vehicle which they carry, and that the forward component of their slope is primarily responsible for their caster effect, caster may be measured with the present apparatus in terms of the change in the camber of a wheel between predetermined right-turn and left-turn positions thereof as measured on the base scales 44. Having, for instance, a wheel set in a predetermined left-turn position, its camber angle is measured by applying the testing head in the previously described manner, and the wheel is then swung to a predetermined right-turn position for a second reading of its camber angle. The difference between the two camber angle readings is taken as a measure of caster for the tested wheel, the correctness of the measure being checked by reference to an appropriate tabulation (not shown) based on the steering angles used and the manufacturer's specification for the particular vehicle being tested. Caster determinations are made individually for the different wheels, and the turn angles for gauging are preferably at least twenty-five degrees.

The total toe-in angle may be measured with the test bar 56 levelled, as by the use of the level 57 when its levelling line is set parallel to the bar 56 and the line of the gauge points 76. For measuring toe-in, one bar 56 and the opposed wheel are set in straight-ahead position, as in Figure 5, and the simultaneous angularity of the other wheel from straight-ahead is measured by engaging the gauge points 76 of the other bar against the wheel and measuring the resulting angle on the appropriate base scale 44 for comparison with the desired total toe-in angle specified for the vehicle.

Turning radius relations are measured by setting one wheel at a predetermined turn angle and then measuring the turning angle of the other wheel, the angles being measured on the different scales 44 of the post bases while the pairs of gauge points 76 of the horizontally disposed bars 56 engage the different wheels. If the difference of the two angle readings is not that specified by the manufacturer, appropriate correction is made with respect to the second wheel, each wheel being tested separately under the foregoing proceedings.

Since the king-pin axis should preferably intersect the central plane of the tire tread at the level of the bearing point for the tire, the present apparatus is also adapted for use in measuring the lateral component of the king-pin slope, this, in effect, comprising a measurement of the angle between the king-pin-receiving bore and the spindle of the steering knuckle 18, and usually being referred to as king-pin inclination. For checking the king-pin inclination, a wheel is set at a predetermined turning angle from straight-ahead by reference to the appropriate scale 44, and the opposed bar 56 has its points 76 applied against spaced points of the wheel in a generally horizontal line and so that the line of said points is parallel to the wheel plane. Having the level gauge 57 extending parallel to the bar 56, the wheel is suitably marked with chalk or the like opposite the gauge points 76, and the reading on the level scale 72' is taken.

Because of the king-pin inclination, the disposal of the wheel at a different steering angle will change the angle of the line of the aforesaid marks on the wheel with respect to the horizontal, if the wheel is held against rotation, and it is this change which is utilized as a measure of king-pin inclination. Accordingly, the marked wheel is held against rotation about its spindle, as by settling the wheel brake or other means, and is set in another predetermined turn position by the use of the appropriate scale 44, the bar being then applied for measuring the new angular relation of the line of marks to the horizontal. In practice, the setting of the bar might be horizontal, whereby the first level gauge reached would be zero and the second level gauge reading would be directly usable for reference to a proper value thereof for a given range of turn settings for the wheel. Also, the wheel settings may be at equal angles in opposite directions from straight-ahead and for which the reference value would be given; in practice, angles of at least twenty-five degrees are used.

It will be understood that well-known and appropriate corrections are made with respect to wheels which are found to be misaligned. Also when the various pivot bolts of the post and thread assembly have been appropriately adjusted, friction alone may be relied on to retain the parts in desired adjusted relation; accordingly, no clamp screws or detent pins are provided or required in the present apparatus, and the settings of its parts may be made most speedily.

From the foregoing description of my invention, taken in connection with the accompanying drawings, the advantages of the construction and use will be readily understood by those skilled in the art to which the invention appertains. While I have described the features and use of an arrangement which I now consider to be a preferred embodiment of my invention, I desire to have it understood that the showing is primarily illustrative, and that such changes may be made, when desired, as fall within the scope of the following claims.

I claim:

1. In a wheel gauging apparatus of the class described, a testing head for operative disposal adjacent a side of a dirigible wheel to be tested, a base member mounted for measured angular adjustments thereof about a vertical axis through the bearing point of the wheel, and a parallelogram post carrying said head and extending from said base member and comprising mutually parallel upright members hingedly connecting equally spaced points of the base and head and including said vertical axis in its plane and distortable in its said plane to adjustably space the head from the wheel for a gauging of the wheel alignment relations by use of the head.

2. In a wheel gauging apparatus of the class described, a testing head for operative disposal adjacent a side of a dirigible wheel to be tested, a base member mounted for measured angular adjustments thereof about a vertical axis through the bearing point of the wheel, and a parallelogram post supporting said head and comprising mutually parallel upright elements hinged to and extending upwardly from the base member for movement in a common vertical plane including said vertical axis and hingedly connected by a top cross member at equal distances from their bottom hinge points, said top post member directly mounting said head in angularly adjusted relation thereto in such manner that the angularity of the set head with respect to the base member is constant for all positions of the head with respect to the wheel.

3. In a wheel gauging apparatus of the class described, a testing head for operative disposal adjacent a side of a dirigible wheel, a base, and a parallelogram post carrying said head at its top and comprising mutually parallel upright members hingedly connecting equally spaced points of the base and head for the distortive swinging of the post in a vertical plane including the bearing point of the wheel.

4. In a wheel gauging apparatus of the class described, a testing head for operative disposal adjacent a side of a dirigible wheel, a base, a parallelogram post extending upwardly from the base and comprising mutually coplanar upright members hingedly connected to the base at spaced points thereof and hingedly connected by a tie member at corresponding points thereof spaced as the base points and at equal distances from the latter and arranged for its distortive swinging toward and from the wheel in a vertical plane which includes the wheel bearing point when the wheel is in straight-ahead position, and means mounting the testing head on the post for its angular adjustment about an horizontal axis.

5. In a wheel gauging apparatus of the class described, a testing head for operative application at a side of a dirigible wheel, a base, a head-mounting member, a parallelogram post extending upwardly from the base and comprising mutually parallel upright members hingedly connecting equally spaced points of the base and of the head-mounting member to permit a distortion of the post in a plane including the bearing point of the wheel, and means mounting the testing head on the head-mounting member of the post for its angular adjustment about a common hinging axis of an upright post member and the head-mounting member of the post.

6. In apparatus for gauging the alignment relations of a dirigible wheel which is fixedly supported for its steering swinging from an intermediate straight-ahead position thereof, a gauging head having mutually swivelled sections whereof one fixedly mounts a gauge bar in perpendicular relation to the axis of swivelling of the sections and for gauging application at the side of the wheel and the other section comprises a head-mounting member, a base, and a support post extending upwardly from the base and hingedly engaging the head-mounting member to support the head for its movement in an upright plane to and from positions of its operative application with respect to the wheel and for the adjusted swinging of the head about an horizontal axis which is perpendicular to the swivel axis of the sections and to said plane.

7. In apparatus for gauging the alignment relations of a dirigible wheel which is fixedly supported for its steering swinging from an intermediate straight-ahead position thereof, a post for mounting a gauging head for its movement to and from positions of its operative application with respect to the wheel, a gauging head having mutually swivelled sections whereof one fixedly mounts a gauge bar in perpendicular relation to the axis of swivelling of the sections and for gauging application at the side of the wheel and the other is directly hinged to the post for adjusted swinging about an horizontal axis which is perpendicular to the swivel axis of the sections; and a calibrated level gauge mounted on the first head section and adjustably positionable with respect thereto to directly indicate the angularity of the bar and/or the swivel axis of the head sections with respect to the horizontal.

8. In apparatus for gauging the alignment relations of a dirigible wheel which is fixedly supported for its steering swinging from an intermediate straight-ahead position thereof, a post for mounting a gauging head for its movement to and from positions of its operative application with respect to the wheel, a gauging head having mutually swivelled sections whereof one fixedly mounts a gauge bar in perpendicular relation to the axis of swivelling of the sections and for gauging application at the side of the wheel and the other is directly hinged to the post for adjusted swinging about an horizontal axis which is perpendicular to the swivel axis of the sections, and a level gauge mounted on the first head section for adjusted swinging about an axis perpendicular to said swivel axis and between positions in which its levelling line is respectively parallel and perpendicular to said swivel axis.

9. In apparatus for gauging the alignment relations of a dirigible wheel which is fixedly supported for its steering swinging from an intermediate straight-ahead position thereof, a post for mounting a gauging head for its movement to and from positions of its operative application with respect to the wheel, a gauging head having mutually swivelled sections whereof one fixedly mounts a gauge bar in perpendicular relation to the axis of swivelling of the sections and for gauging application at the side of the wheel and the other is directly hinged to the post for adjusted swinging about an horizontal axis which is perpendicular to the swivel axis of the sections, and a calibrated level gauge swivelled on the first head section for the adjusted swinging of its levelling line about an axis perpendicular to said swivel axis and in a plane parallel to the gauge bar.

10. In apparatus of the class described, for gauging a dirigible wheel mounted for swinging from a straight-ahead setting thereof, a base member mounted for measured angular adjustments thereof about a vertical axis through the bearing point of the wheel, a parallelogram post extending from said base member and comprising mutually coplanar upright members hingedly connected to the base at spaced points thereof and hingedly connected by a tie member at corresponding points thereof spaced as the base points and at equal distances from the latter and including said vertical axis in its plane and having the hinging axes of its members horizontal, a gauging head having mutually swivelled sections whereof one section fixedly mounts a gauge bar in fixed angular relation to the axis of swivelling of the sections and the other section is directly hinged to the post for swinging about an axis parallel to the hinging axes of the post elements, and a level gauge mounted on the bar-carrying section of the head for use in measuring the angularity of the bar with respect to the horizontal during a gauging application of the bar.

11. A structure in accordance with claim 10 having solely an adjustable and yielding friction means at each hinging and swivel axis to retain the connected elements thereat in angularly adjusted relation.

12. In apparatus for gauging the alignment relations of a dirigible wheel which is fixedly supported for its steering swinging from an intermediate straight-ahead position thereof, a gauging head having mutuallly swivelled sections whereof one fixedly mounts a gauge bar in perpendicular relation to the axis of swivelling of the sections and for gauging application at the side of the wheel and the other section comprises a head-mounting member, a support post having the head-mounting member adjustably hinged thereto to support the head for its movement in an upright plane to and from positions of its operative application with respect to the wheel and for the adjusted swinging of the head about an horizontal axis which is perpendicular to the swivel axis of the sections and to said plane, and means on said head operative to directly indicate the angularity of the bar and/or the swivel axis of the head sections with respect to the horizontal.

13. In a wheel gauging apparatus of the class described, a testing head for operative disposal adjacent a side of a dirigible wheel to be tested, a base member carrying said head and mounted for angular adjustments of the head in opposite directions from an intermediate zero setting thereof and about a vertical axis through the bearing point of the wheel, and a fixed reference member adjacent said base member, one said member being provided with coextensive angle scales having their zero points at relatively opposite ends of the scales and arranged for their simultaneous registration with corresponding index marks on the other member when the head is in its said zero setting whereby the different said scales are utilizable with reference to their said corresponding index marks to measure opposite angular displacements of the head from its zero setting.

JOHN L. CREAGMILE.